UNITED STATES PATENT OFFICE.

JAMES W. CAMPBELL, OF PHILADELPHIA, PENNSYLVANIA.

IMPROVEMENT IN PRESERVING CRANBERRIES.

Specification forming part of Letters Patent No. 117,256, dated July 25, 1871.

*To all whom it may concern:*

Be it known that I, JAMES W. CAMPBELL, of the city of Philadelphia and State of Pennsylvania, have invented a certain Process for Preserving Cranberries in a fresh and natural condition, of which the following is a specification:

My invention is intended to counteract the perishable nature of this fruit so that it can be transported by land or exported by water without deterioration, shrinkage, or loss, that its original flavor and inherent qualities may be continued for an indefinite period, and the fresh appearance and rotundity, which to a great extent govern the market value of this fruit, may be retained and perpetuated.

The shrinkage in quantity incident to carrying cranberries during the selling season of eight months is equal to one-fourth of their value at the time of gathering, and the method of treating this fruit hitherto adopted is imperfect, inefficient, and costly.

In the application of my process I take fresh, sound, ripe, uncooked cranberries, and put them in a suitable can or vessel. I then fill the receptacle with water and close its mouth by soldering a cover on it or sealing it up. I then immerse the vessel with its contents in hot water and allow it to remain therein until the air in the interior is sufficiently expanded. I then make a vent in the cover for the escape of the rarefied air, whereupon the vent is sealed up before the vessel becomes cool and rendered air-tight.

My treatment of the fruit makes it unnecessary to cook the berries to retain and perpetuate their natural qualities, as is commonly done, but with unsatisfactory results; nor need the fruit be mixed with sugar, sirup, or other ingredients. Subjected to my treatment cranberries retain a fresh condition for cooking purposes for a prolonged period, and may be transported without injury to distant places, and will not be impaired by change of climate or the effects of a sea voyage.

My improvement will open foreign markets to the American cultivators of cranberries and increase their facilities for disposing of their crops at remunerative prices.

I expressly disclaim exposing hermetically-sealed cans or vessels to heat for any length of time for the purpose of coagulating the juices or counteracting the tendency to putrefaction. I likewise disclaim completely cooking the cranberries undergoing treatment by my process. I also disclaim keeping the cranberries from contact with water or steam. On the contrary, by my process, I expose the cranberries to direct contact with both water and steam. I furthermore disclaim cooking the contents of a can or other vessel to such a degree as to require it to be punctured when first heated to prevent bursting, or otherwise to give vent to the contained air soon after heating; and I disclaim continuing the heat after venting or resealing said can or vessel.

I claim as my invention—

The described new article of manufacture, namely, uncooked fresh cranberries, so treated as to retain their natural qualities without drying, stewing, or admixing sugar, sirup, or other ingredient, substantially in the manner and for the purposes herein set forth.

JAS. W. CAMPBELL.

Witnesses:
ALBERT G. SHIELDS,
FRANKLIN E. FELTON.